United States Patent Office 3,318,689
Patented May 9, 1967

3,318,689
TREATMENT OF LATERITES
Nicolas Zubryckyj and Vladimir Nicolaus Mackiw, Fort Saskatchewan, Alberta, Canada, assignors to Sherritt Gordon Mines Limited, Toronto, Ontario, Canada, a company of the Province of Ontario
No Drawing. Filed Dec. 24, 1963, Ser. No. 333,210
6 Claims. (Cl. 75—119)

This invention relates to a process for treating nickel and/or cobalt oxidized ores such as nickeliferous laterites; more particularly, it releates to an efficient, economic process for recovering nickel and/or cobalt values from such material by a novel reduction-leach technique.

A large proportion of the world's nickel resources are contained in oxidized ores such as limonitic laterites, and garnierite or serpentine. However, the recovery of the nickel and cobalt from these materials has long presented serious problems to the metallurgical industry, the nature of these problems and the various efforts to overcome them being well documented in the patent and other technical literature. The problems result, primarily, from the fact that oxidized ores of this type generally contain only relatively small amounts of nickel and cobalt, of the order of about 1 weight percent nickel and about 0.1 weight percent cobalt, and the concentration of these metals cannot be increased by conventional ore benefication methods. As a result, it is necessary to treat the entire bulk of the ore metallurgically for the recovery of the relatively small amounts of contained nickel and/or cobalt values.

Processes which are known and have been used for the treatment of garnieritic and limonitic laterites include direct treatment processes such as smelting to produce ferro-nickel and direct acid leaching of the raw ore to dissolve and extract metal values. Also, many so-called indirect processes involving, for example, sulphating or chloridizing roasting followed by leaching with water, or preliminary reduction followed by leaching with acid or ammoniacal solutions have been proposed. The well-known "Caron" process is an example of the latter method. In general, these known methods are subject to disadvantages which render them uneconomical for commercial operation or, at the best, make them economically marginal operations. Among the more serious disadvantages are high cost of equipment, chemical reagents, and operation, particularly in view of the large quantity of ore that must be treated to recover relatively small amounts of nickel and/or cobalt; and the complexity of the operations required to obtain effective separation of the nickel and cobalt from the other constituents of the ores.

We have now discovered a surprisingly simple and efficient method for treating limonitic and garnieritic laterites or mixtures thereof which overcomes the disadvantages of the prior art processes and by means of which very high nickel and cobalt extractions can be obtained. Simply stated, the method of this invention involves the reduction of the ore by hydrogen, carbon monoxide or other suitable reducing agent under closely controlled conditions to reduce substantially all the nickel and/or cobalt content of the ore to a metallic state with accompanying reduction of the bulk of the iron oxide to magnetite. The reduced ore is then leached under oxidizing conditions and in the presence of sulphur dioxide, in an aqueous solution. In the preferred method, the calcine is dispersed in water and the resulting slurry treated, such as by aeration, at atmospheric pressure and ambient temperatures with a gaseous mixture of sulphur dioxide and oxygen or an oxygen bearing, oxidizing gas such as air. Aeration with the sulphur dioxide-air mixture is continued until substantially all the metallic nickel and cobalt have been extracted from the slurried material. The leach solution is then separated from the undissolved residue and treated to precipitate a high grade mixed nickel-cobalt sulphide concentration. Because the residue consists mainly of magnetite the liquid-solids separation can be effected relatively easily.

After disclosure, the relative simplicity of the method becomes readily apparent. However, in the actual practice of the invention there are conditions which must be observed in order to ensure economic operation of the process and optimum extraction and recovery of the desired nickel and cobalt from the large amount of ore that must be treated in conducting a practical commercial operation.

Materials which are readily amenable to treatment by the present process include both the "high iron" or limonitic laterites and the "high magnesia" nickel-bearing ores such as serpentine or garnierite. The essential difference between these two types of ore lies in their silica, magnesia and iron contents. Table I below, illustrates the possible range of composition of each of these types of ore.

TABLE I

| | Chemical Analysis, Percent | |
|---|---|---|
| | Serpentine (garnierite) Ore, percent by weight | Limonitic Ore, percent by weight |
| Ni | *1.0 – 4.0 | 0.10 – 3.0 |
| Co | 0.05 – 0.08 | 0.05 – 0.25 |
| Fe | 8 – 18 | 35.0 – 60.0 |
| Cr | 0.8 – 2 | 1 – 3 |
| MgO | 25 – 38 | 0.2 – 1.0 |
| Al$_2$O$_3$ | 1 – 3 | 4 – 18 |
| SiO$_2$ | 40 – 55 | 1.3 – 6 |
| CaO | 1 – 2 | 0.6 – 0.1 |
| MnO | 0.5 – 1 | 0.3 – 2.5 |

*Serpentine type ore may occasionally have an Ni content as high as 12% by weight.

The starting material, which may consist of either of the tyes of ore described generally above or of mixtures of the two types, is first heated under controlled conditions and in the presence of a reducing agent to reduce the nickel and cobalt oxide in the ore to metallic form with accompanying reduction of the iron oxide to magnetite. The preferred reducing agents are hydrogen, or carbon monoxide or mixtures thereof. However, other materials such as coal or coke fines may also be used under the proper operating conditions. The reducing reaction can be conducted in a conventional roasting furnace such as a multiple hearth furnace, rotary kiln or a fluo-solids roaster It is usually conducted at a temperature of from about 800° F. to 1500° F., preferably at about 1200° F., and is continued to reduce the nickel and cobalt oxides to the metallic state with a minimum accompanying reduction of iron oxide to metallic iron. In treating high iron limonitic laterites containing, for example, above about 40% iron, it is particularly important that the time of the roast be very closely controlled, depending on the temperature, to ensure that only a minimum amount of iron is reduced to the metallic state. The close control of roasting conditions is less important in the case of the low iron, high magensia ores as there is less tendency for the iron oxide content to be reduced to the metallic iron.

The reduced calcine is dispersed in water to form a slurry which, preferably, contains from about 10% to about 60% solids. The water-calcine slurry is then leached in the presence of sulphur dioxide and oxygen or an oxygen bearing gas such as air. Preferably, the sulphur dioxide and the oxidizing gas are provided in the slurry by aeration with a gaseous sulphur dioxide-air mixture. Aeration is continued with this gaseous mixture and the slurry agitated at ambient temperature until substantially all the nickel and cobalt are extracted from the calcine particles and dissolved in the aqueous solution. Higher temperatures, up to the boiling point of the solution, can be used; but we have found that elevated temperatures do not significantly improve extractions of nickel and cobalt, and in some cases the high temperatures actually reduce extractions. The preferred temperature is, therefore, within the range of from about 40° F. to about 100° F.

The sulphur dioxide or sulphur dioxide-air mixture fed into the leaching vessel contains at least 1% $SO_2$ by volume and preferably from about 2% to about 10% by volume $SO_2$. This mixture is fed continuously into the agitated slurry until substantially all of the metallic nickel and cobalt are extracted from the slurried calcine. Any unreacted gaseous sulphur dioxide is recovered and recycled into the solution. Unreacted sulphur dioxide in the solution, i.e. as dissolved $SO_2$ or sulphurous acid, is utilized by re-cycling leach liquor to the calcine slurrying step. Thus, actual consumption of sulphur dioxide is only that amount required to supply the sulphur for converting the soluble metal values to sulphates. In most cases, about 1½ to about 6 hours is required to extract about 80% to about 95% of the nickel and cobalt contained in the starting material. Longer or shorter periods of time may be required in some cases depending on the nature of the particular ore treated and the exact operating conditions.

Although the preferred procedure is to provide the sulphur dioxide in gaseous form mixed with the oxidizing gas, the sulphur dioxide can also be, if desired, formed in situ in the slurry by adding to the slurry a soluble sulphite compound, such as ammonium sulphite or sodium sulphite, in amount sufficient to provide, on decomposition, the desired concentration of sulphur dioxide. Gaseous sulphur dioxide and soluble sulphite compounds can also be used together if desired.

Simultaneously with the extraction of nickel and cobalt, essentially all the metallic iron content of the slurried calcine is also extracted. However, since only the iron in metallic form is affected, where the ore reduction has been carried out with a minimum reduction of iron to metallic iron, the iron extraction, and thus consumption of sulphur dioxide by the iron, is relatively small. Manganese, if present, is only partially affected under the leaching conditions and generally less than 50% of the Mn present in the starting material will be extracted and dissolved in the leach solution.

In treating the high magnesia ores, such as garnierite and serpentine in which the iron content is relatively low (less than 10 to 15% by weight usually) the control of the reduction step to minimize reduction of iron oxide to metallic iron is less important. Particularly in treating ores containing less than 10 weight percent iron, all the iron could, if desired, be reduced to the metallic state in order to assure maximum reduction of nickel and cobalt. The iron would then be leached out with the nickel and cobalt but with this low iron content, the consumption of sulphur by the iron would not be excessive, nor would the amount of iron in solution be a problem in the subsequent nickel and cobalt separation steps.

Under the mild conditions of the oxygen-sulphur dioxide leach, the magnesia is only partially solubilized; thus, high magnesia, low-iron ores can be treated with particular advantage by the method of this invention. Also, the solubilization of aluminum and chromium is negligible and thus essentially no sulphur is consumed by these metals and they do not contaminate the leach solution.

After completion of the sulphur dioxide-oxidizing gas leaching step, the leach solution, which is separated from the undissolved residue by conventional procedures, such as filtration, or other methods which utilize the magnetic properties of the magnetite in the residue, is treated to precipitate the nickel and cobalt as a high grade mixed sulphide concentrate. The pH of the leach solution at the completion of the leaching step will generally be in the range of from about 1.5 to about 4.5; thus the solution can be directly treated with an appropriate sulphidizing agent according to the known methods for stripping nickel and cobalt from acidic solutions such as those described, for example, in United States Patent No. 2,726,953 to T. K. Roy et al. The method described in this patent involves treating the non-ferrous metal bearing leach solution with hydrogen sulphide gas at a temperature within the range of from about 60° C. to about 90° C. and under a partial pressure of hydrogen sulphide above about 10 p.s.i. A small amount of nucleation agent, such as finely divided, random sized, metal sulphides, obtained from a previous precipitation is provided in the solution subjected to treatment to promote the initiation of and accelerate the sulphidizing reaction and reduce plastering or plating of the precipitated sulphides on the reaction vessel walls.

The mixed sulphides can then be treated by known procedures for the recovery of substantially pure nickel and cobalt. A preferred method is to leach the mixed sulphides with an aqueous ammoniacal ammonium sulphate solution at elevated temperature and pressure in the presence of an oxygen bearing oxidizing gas to dissolve the nickel and cobalt as complex metal ammines. Using this procedure, any iron sulphides present in the mixed sulphides remain in the insoluble residue as iron oxide, and the nickel and cobalt can be separately recovered from the clarified leach solution by known hydrogen reduction precipitation techniques.

The operation of this invention is illustrated by the following examples. Except where otherwise noted, all percentages are by weight. The materials treated were New Caledonian limonitic ore and New Caledonian serpentine ore having the following analyses:

| Chemical Analysis, Percent | New Caledonian limonite | New Caledonian serpentine |
|---|---|---|
| Ni | 1.47 | 0.85 |
| Co | 0.24 | 0.032 |
| Fe | 46.5 | 13.2 |
| Mg | 0.67 | 14.9 |
| Mn | 1.13 | 0.19 |
| Cr | 2.34 | 0.69 |
| Al | 2.17 | 0.37 |
| $SiO_2$ | 6.3 | 38.2 |
| Ignition loss | 12.6 | 11.0 |

Example I 100 grams of New Caledonian limonitic ore were heated in a rotary kiln at a temperature of 1200° F. for 1 hour while hydrogen was passed into the kiln at the rate of 0.5 litre per minute. The reduced laterite was then cooled and slurried in about 500 ml. water. The slurry was aerated at room temperature with a stream of air containing 7% by volume sulphur dioxide. The air-$SO_2$ flow was continued at the rate of 3 litres per minute for 6 hours. The slurry was continually mechanically agitated during this time. At the end of the leaching period, the slurry was filtered, the residue washed with water and dried. Extractions of nickel and cobalt (based on residue analysis) were 93% and 90% respectively. $SO_2$ consumption was 19% by weight of the dry ore or S consumption=9.5% by weight ore (equivalent to 30% by weight of the ore $H_2SO_4$).

Example II

The above procedure was repeated on a second sample of New Caledonia limonitic ore except that the air-$SO_2$ leach was conducted at a temperature of 190° F. The nickel extraction was 84% and the cobalt extraction 74% (on a residue basis). Thus, leaching at an elevated temperature is less efficient than at ambient temperature.

Example III 100 gm. of New Caledonian limonitic ore was heated to 1200° F. for 15 minutes. During heating, hydrogen was passed into the kiln at the rate of 1.4 l./min.

The reduced ore was then cooled and slurried in 500 ml. water. The slurry was aerated at room temperature with a stream of air containing 7% by volume sulphur dioxide. The air-$SO_2$ flow was continued at the rate of 3 litres per minute. Samples of leach slurry were withdrawn every hour. The extractions of nickel on a residue basis as a function of leaching time are shown in Table II.

TABLE II

| Leaching Time hrs. | Percent Ni in leach residue | Percent Ni Extraction |
|---|---|---|
| 0 | 1.84 | 0 |
| 1 | 0.50 | 69 |
| 2 | 0.14 | 93 |
| 3 | 0.12 | 93.5 |
| 4 | 0.12 | 94 |
| 5 | 0.12 | 94.5 |
| 6 | 0.11 | 94.5 |

Thus, 2 hours' leaching time was sufficient to extract substantially all the nickel from the partially reduced New Caledonian ore.

Example IV 4 batches, 100 gm. each, of New Caledonian limonitic ore were heated in a rotary kiln to 1000° F. for 15 minutes, 30 minutes, 45 minutes and 60 minutes. Hydrogen was passed into the kiln at the rate of 1.4 litres/min. during heating. The reduced samples were then cooled and slurried separately in about 500 ml. water. Each slurried batch was mechanically agitated and aerated in a stream of air containing about 7% by volume sulphur dioxide. The air-$SO_2$ flow was continued at the rate of 3 litres per minute for 6 hours. At the end of leaching period the slurry was filtered, the residue washed with water and dried. Extractions of nickel and cobalt as a function of reduction time are shown in Table III.

TABLE III

| Hydrogen Reduction Time, mins. | Percent Extraction | |
|---|---|---|
| | Ni | Co |
| 15 | 92.8 | 89.4 |
| 30 | 94.0 | 89.4 |
| 45 | 96.0 | 87.2 |
| 60 | 90 | 75.8 |

Thus, about 15 minutes reduction time at either 1200° F. (Example 3) or at 1000° F. is adequate for substantially complete solubilization of nickel.

Example V 100 gms. of a mixture of 80% New Caledonian limonitic ore and 20% New Caledonian serpentine were heated at 1200° F. for 15 minutes, under a stream of hydrogen of 1.4 litres/min. The reduced mixture was slurried in water and then aerated with a stream of air containing 7% by volume sulphur dioxide. The aeration was continued with agitation for 3 hours. At the end of this period, the slurry was filtered, the residue washed with water and dried. Extraction of nickel (based on residue analysis) was 85%. The pH of the leach liquor was 3.4. Thus, in spite of an Mg increase from 0.67% (New Caledonian limonite) to 3.5% (the mixture) high nickel extractions were still obtained.

Example VI 200 gms. of New Caledonian limonitic ore were heated in a rotary kiln at 1200° F. for 15 minutes. Hydrogen was passed into the kiln at the rate of 1.4 l./min. during heating. The reduced ore was cooled and slurried in about 1000 ml. water. The slurry was aerated at room temperature with a stream of air containing 2.7% by volume sulphur dioxide. The air-$SO_2$ flow was continued at the rate of 3 litres per minute for 3 hours total time.

At the end of the leaching period the slurry was filtered and the residue washed with water and dried. Extraction of nickel and cobalt (based on residue analysis) was 90% and 83.5% respectively.

The method of this invention possesses a number of important advantages over the prior art processes for treating nickel and/or cobalt bearing lateritic and serpentine ores. The most important advantage is the relative simplicity of the overall process. Also, important from a commercial point of view, is the low consumption of chemical reagents and the relatively mild conditions under which the process is conducted. Reagent costs and the capital and maintenance costs of equipment and apparatus is kept at a minimum.

It will be understood, of course, that modifications of the preferred embodiment of the invention described herein can be made without departing from the scope of the invention defined by the appended claims.

What we claim as new and desire to protect by Letters Patent of the United States is:

1. A process for the recovery of nickel and cobalt values from oxidized lateritic and garnieritic nickel and cobalt bearing ores which comprises heating the ore at a temperature within the range of from about 800° F. to about 1500° F. in contact with a reducing agent for a time sufficient to selectively reduce nickel and cobalt oxides in the ore to the metallic state with a minimum accompanying reduction of iron oxide to metallic iron; dispersing the so-reduced ore in water to produce a slurry having a solids content of between about 10% and about 50% by weight; agitating said slurry and reacting it at atmospheric pressure and at a temperature below the boiling point of the slurry with sulphur dioxide and an oxygen bearing, oxidizing gas to convert metallic nickel and cobalt to water soluble sulphates; separating the undissolved residue from the solution and treating said solution directly with a sulphidizing agent to convert dissolved nickel and cobalt values to sulphides and precipitate them from said solution, and recovering precipitated sulphides from said solution.

2. The method according to claim 1 in which the reaction of the slurry with sulphur dioxide and an oxygen bearing, oxidizing gas is carried out at a temperature within the range of from about 40° F. to about 100° F.

3. The method according to claim 4 in which the gaseous mixture of sulphur dioxide and air contains between about 2.0 and about 10% by volume sulphur dioxide.

4. The method according to claim 1 in which the sulphur dioxide and the oxygen bearing, oxidizing gas are supplied in the form of a gaseous mixture of sulphur dioxide and air, said mixture containing below about 15% by volume sulphur dioxide.

5. The method according to claim 1 in which the sulphur dioxide is provided in the slurry in the form of a sulphite compound soluble in the slurry and the oxidizing gas is air.

6. The method according to claim 1 in which leach solution, after separation of the undissolved residue and recovery of the dissolved nickel and cobalt values is recycled to the calcine slurrying step whereby unreacted sulphur dioxide dissolved in the leach liquor is fully utilized.

(References on following page)

References Cited by the Examiner

UNITED STATES PATENTS

| | | | |
|---|---|---|---|
| 1,410,936 | 3/1922 | Leaver et al. | 75—115 |
| 2,094,277 | 9/1937 | Mitchell | 75—115 |
| 2,349,223 | 5/1944 | Hedley et al. | 75—119 |
| 2,726,953 | 12/1955 | Roy et al. | 75—108 |
| 2,778,729 | 1/1957 | Schaufelberger | 75—119 |
| 2,816,015 | 12/1957 | Donaldson | 75—119 |
| 3,058,824 | 10/1962 | Illis | 75—119 |

DAVID L. RECK, *Primary Examiner.*

HYLAND BIZOT, N. F. MARKVA,
*Assistant Examiners.*